(12) United States Patent
Matuura et al.

(10) Patent No.: US 6,729,274 B2
(45) Date of Patent: May 4, 2004

(54) CYLINDER AND METHOD FOR MANUFACTURING A CYLINDER FOR AN INTERNAL COMBUSTION ENGINE

(75) Inventors: Fujihiro Matuura, Kanagawa (JP); Takashi Fujisawa, Kanagawa (JP); Masahiro Inokuma, Hokkaido (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 10/237,298

(22) Filed: Sep. 9, 2002

(65) Prior Publication Data

US 2003/0079344 A1 May 1, 2003

(30) Foreign Application Priority Data

Sep. 14, 2001 (JP) ........................................ 2001-280326

(51) Int. Cl.⁷ ................................................ F02B 75/02
(52) U.S. Cl. .................. 123/65 P; 123/73 PP
(58) Field of Search ............... 123/65 P, 73 R, 123/73 PP (56) References Cited

U.S. PATENT DOCUMENTS 6,041,499 A 3/2000 Matsuura et al. ........ 29/888.06

FOREIGN PATENT DOCUMENTS

JP 11324790 11/1999

*Primary Examiner*—Noah P. Kamen
(74) *Attorney, Agent, or Firm*—Baker Botts L.L.P.

(57) ABSTRACT

A cylinder and a method for manufacturing a cylinder for an internal combustion engine is provided which avoids the generation of a step portion at the scavenging port without necessitating enhanced precision of the positioning of the working tools or the working location. A raw cylinder body is cast-molded with the scavenging port portion thereof being left closed. Subsequently, this closed scavenging port portion is cut out (or opened) by means of cutting work, etc. The cutting out of the closed scavenging port portion is performed by widening the cylinder bore side thereof at predetermined angles to the planes of the inner wall of the hollow scavenging passageway formed contiguous to the closed scavenging port portion.

2 Claims, 10 Drawing Sheets

FIG.1

Prior Art

FIG.2

Prior Art

CYLINDER AND METHOD FOR MANUFACTURING A CYLINDER FOR AN INTERNAL COMBUSTION ENGINE

BACKGROUND OF THE INVENTION

1. Field of the Invention

The present invention relates to a method for manufacturing a cylinder for an internal combustion engine such as a small air-cooled two-stroke gasoline engine which is suited for use in a portable power working machine.

2. Description of the Related Art

Figure 1:
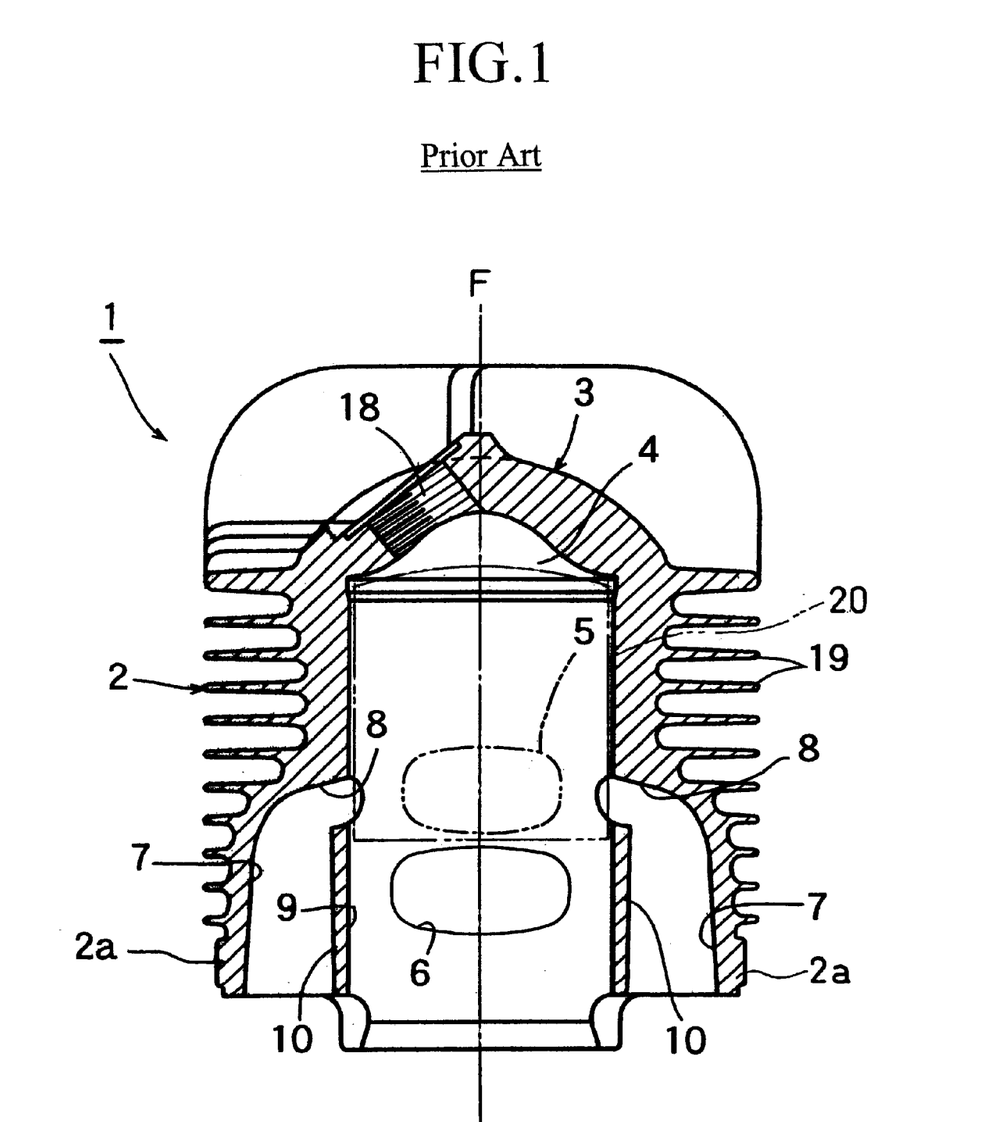
FIG. 1 is a longitudinal sectional view illustrating one embodiment of the cylinder for an internal combustion engine to which the manufacturing method of the present invention can be applied.
Figure 2:
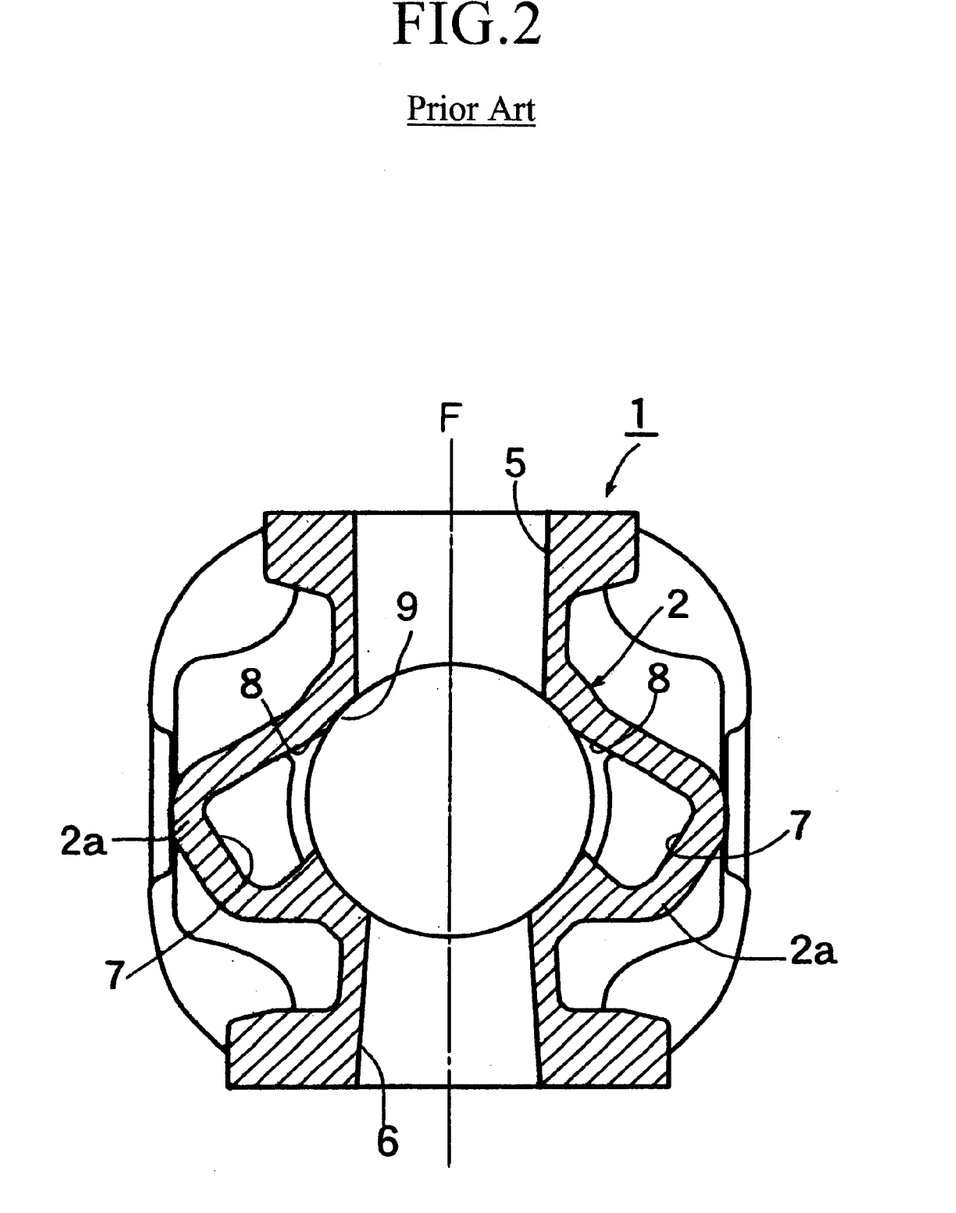
FIG. 2 is a cross-sectional view of the cylinder for an internal combustion engine shown in FIG. 1.

One typical example of a cylinder for a small air-cooled two-stroke gasoline engine currently employed in a portable power working machine is illustrated in FIGS. 1 and 2. Specifically, FIG. 1 shows a longitudinal sectional view of a cylinder 1, and FIG. 2 shows a cross-sectional view of the cylinder, wherein the air-inlet and exhaust ports thereof are shown as being formed at the same level with each other for the convenience of illustration. The cylinder 1 shown in this example is generally formed of an aluminum alloy. The cylinder 1 includes an integral body consisting of a main body 2 having a cylinder bore 9 for allowing a piston 20 to be fitted therein and a pair of columnar expanded portions 2a disposed opposite to each other. The cylinder further includes a head portion 3 provided with a so-called squish dome-shaped combustion chamber 4. The main body 2 is provided, all over the outer wall thereof, with a large number of cooling fins 19. Further, the head portion 3 is provided with an internal thread 18 for mounting an ignition plug.

The cylinder bore 9 is provided with an air-inlet port 5 and also with an exhaust port 6, which are designed to be closed and opened by the movement of the piston 20. The air-inlet port 5 and the exhaust port 6 are disposed opposite to each other in such a manner that they are offset or dislocated level-wise from each other. The columnar expanded portions 2a are respectively provided therein with a hollow scavenging passageway 7 having an inner wall 10 of predetermined thickness. Each hollow scavenging passageway 7 is spaced away from the air-inlet port 5 and the exhaust port 6 by an angle of 90 degrees in the circumferential direction of the cylinder bore 9. These scavenging passageways 7 are respectively provided, at a downstream end portion (upper end portion) thereof, with a scavenging port 8 which is inclined somewhat upward, i.e., in the direction away from where the exhaust port 6 of the cylinder bore 9 is located. The two scavenging ports 8 are also designed so that they are opened and closed by the movement of the piston.

The cylinder 1 mentioned above is a so-called binary fluid scavenging type cylinder where the two scavenging ports 8 are symmetrically formed with respect to the longitudinal section F taken along the middle of the exhaust port 6. However, a so-called quaternary fluid scavenging type cylinder having an additional pair of scavenging ports (two pairs in total) is also known.

In addition to the hollow scavenging passageway provided with the inner wall 10 as shown in FIG. 1, one type of scavenging passageway has no inner wall (the side facing the cylinder bore is opened). Another kind of scavenging passageway has a lower portion with an opening extending along the length of the scavenging passageway while leaving a half-wall at an upper portion thereof. This enables the air-fuel mixture that has been introduced into the scavenging port from the crank chamber via the scavenging passageway to be contacted with the skirt portion of the piston.

Figure 3:
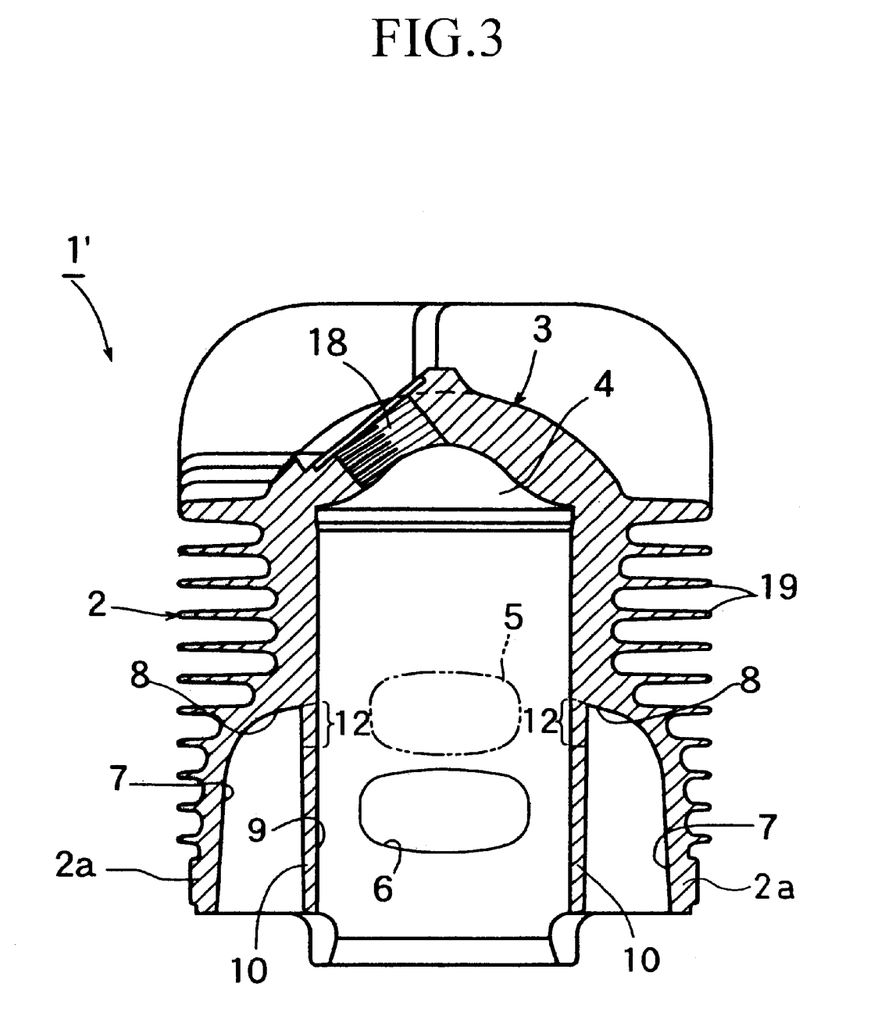
FIG. 3 is a longitudinal sectional view illustrating a raw cylinder body which is cast-molded so as to obtain the cylinder shown in FIG. 1.
Figure 4:
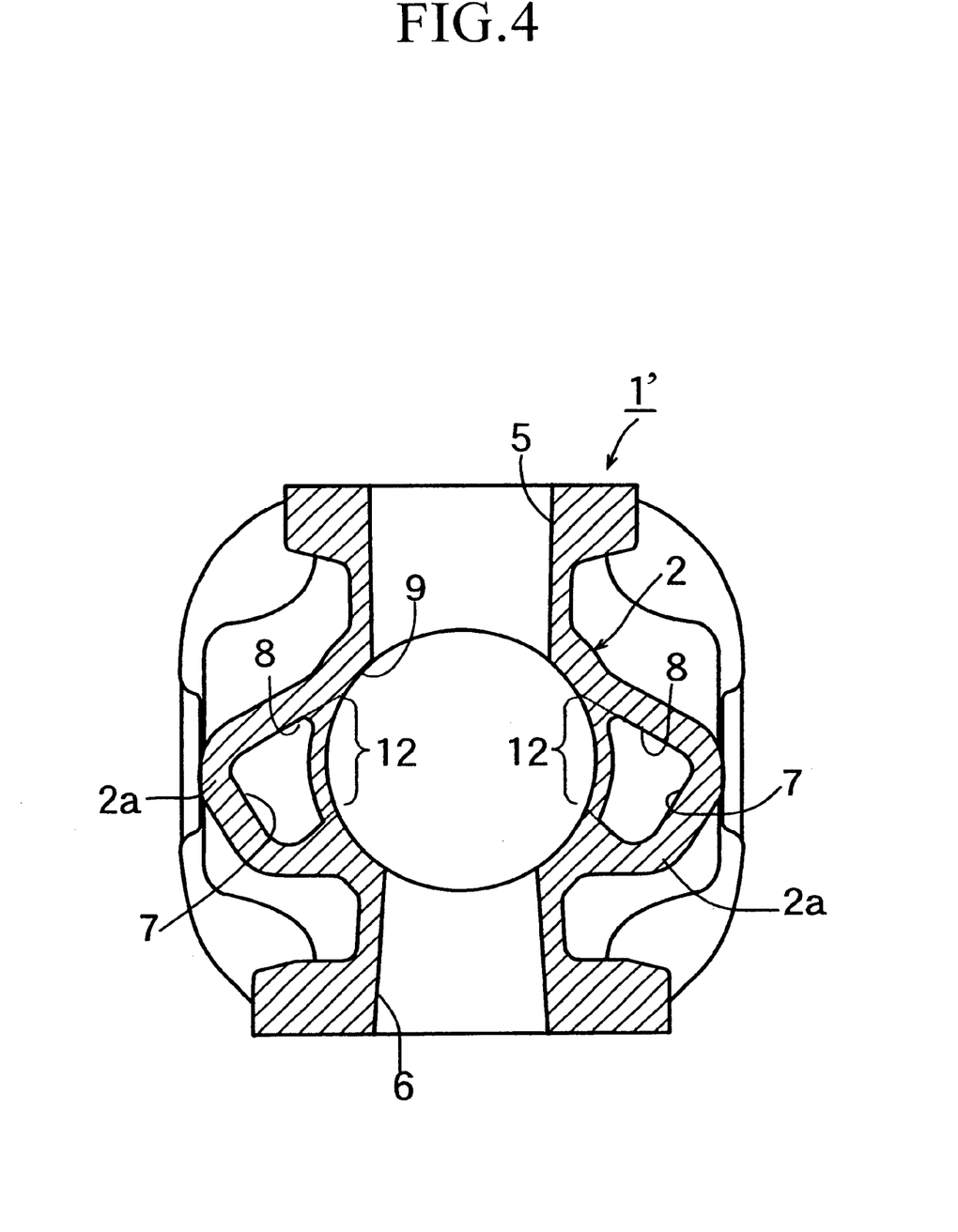
FIG. 4 is a cross-sectional view illustrating a raw cylinder body shown in FIG. 3.
Figure 5:
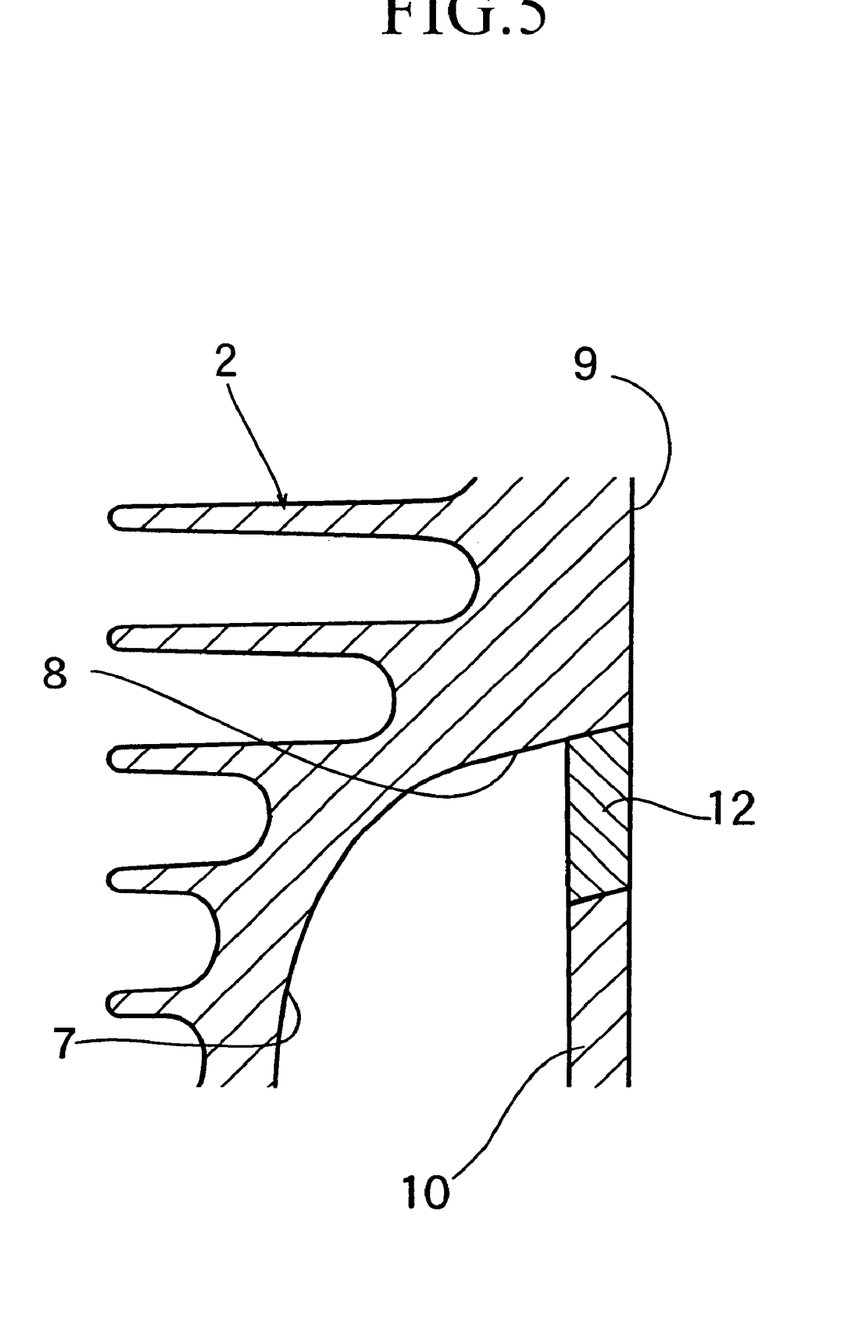
FIG. 5 is an enlarged sectional view for illustrating a peripheral portion of the left scavenging port shown in FIG. 3.
Figure 6:
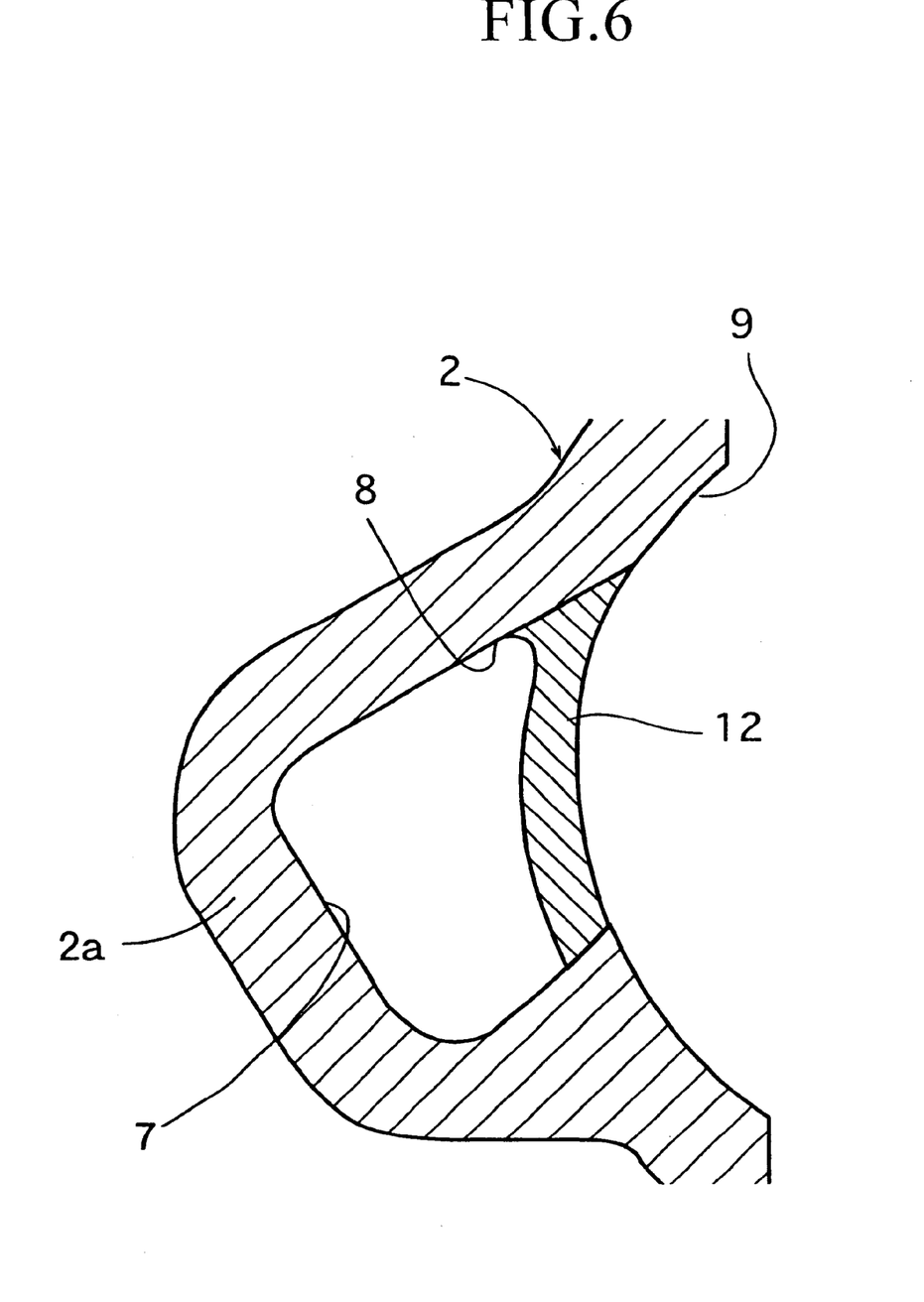
FIG. 6 is an enlarged sectional view for illustrating a peripheral portion of the left scavenging port shown in FIG. 4.

If a cylinder provided in particular with an inner wall-attached (including a half-wall-attached) hollow scavenging passageway among the aforementioned cylinders for a two-stroke internal combustion engine is to be manufactured by means of a die casting method such as a high-pressure die casting method which enables cast moldings of high dimensional precision to be produced at low cost, the scavenging port portion of the scavenging passageway is inevitably formed into an undercut portion. However, since a collapsible core cannot be employed under a high pressure, a raw cylinder body 1' is cast-molded by means of the high-pressure die casting method, resulting in the scavenging port portion (constituting an undercut portion) 12 thereof being left closed as shown in FIGS. 3 and 4. Therefore, the closed scavenging port portion 12 is subsequently cut out (or opened) by mechanical means such as cutting work, electric discharge machining, laser beam machining, etc. For reference, FIGS. 5 and 6 show the closed scavenging port portion 12 to be cut out for forming one of the scavenging ports 8 which is located on the left side in FIGS. 3 and 4, wherein this left side scavenging port portion 12 is depicted as an enlarged view with the hatching thereof being densitied and reversed in direction.

Figure 9:
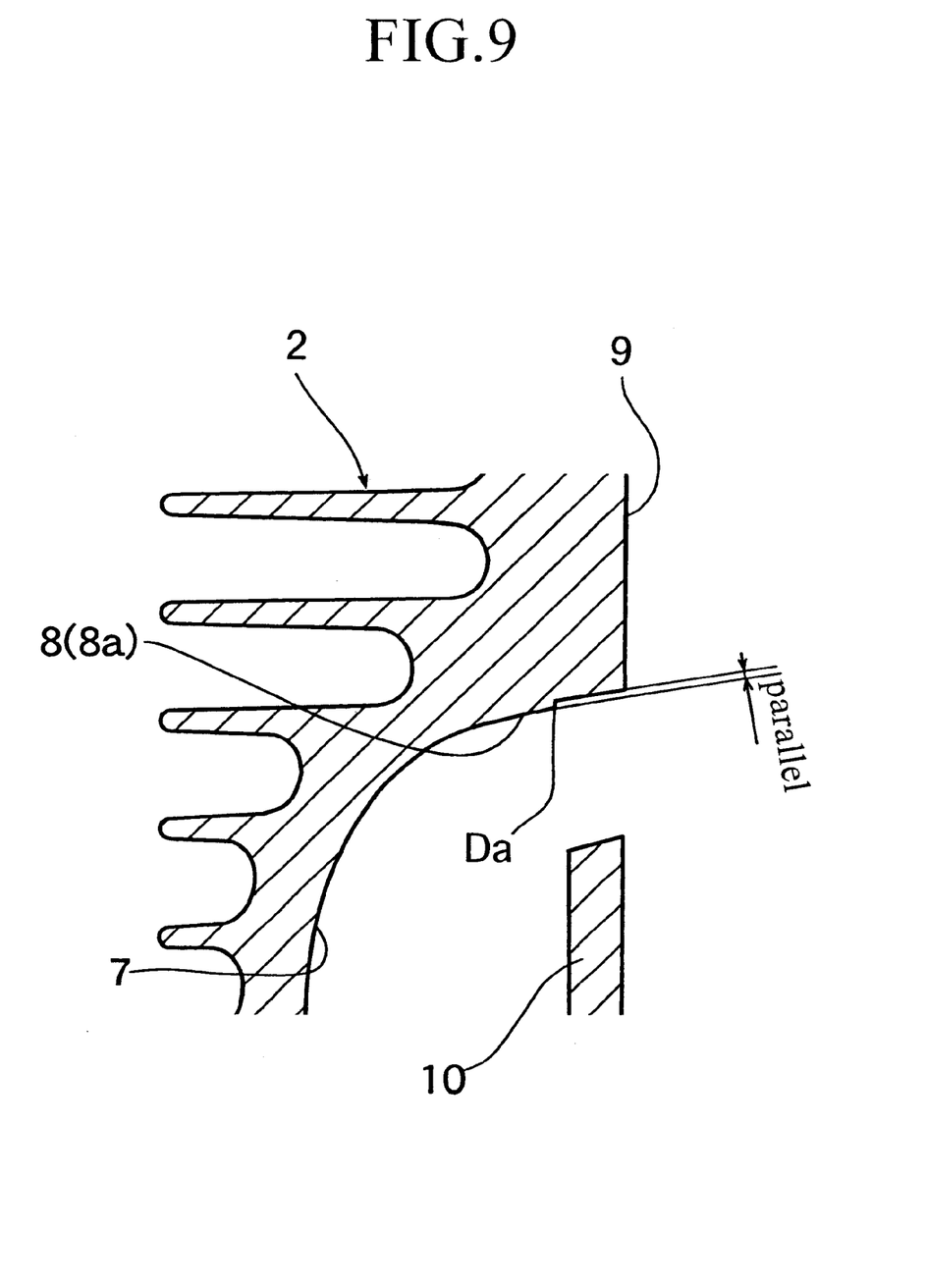
FIG. 9 is an enlarged sectional view for illustrating a peripheral portion of the left scavenging port shown in FIG. 1 for illustrating a conventional manufacturing method.
Figure 10:
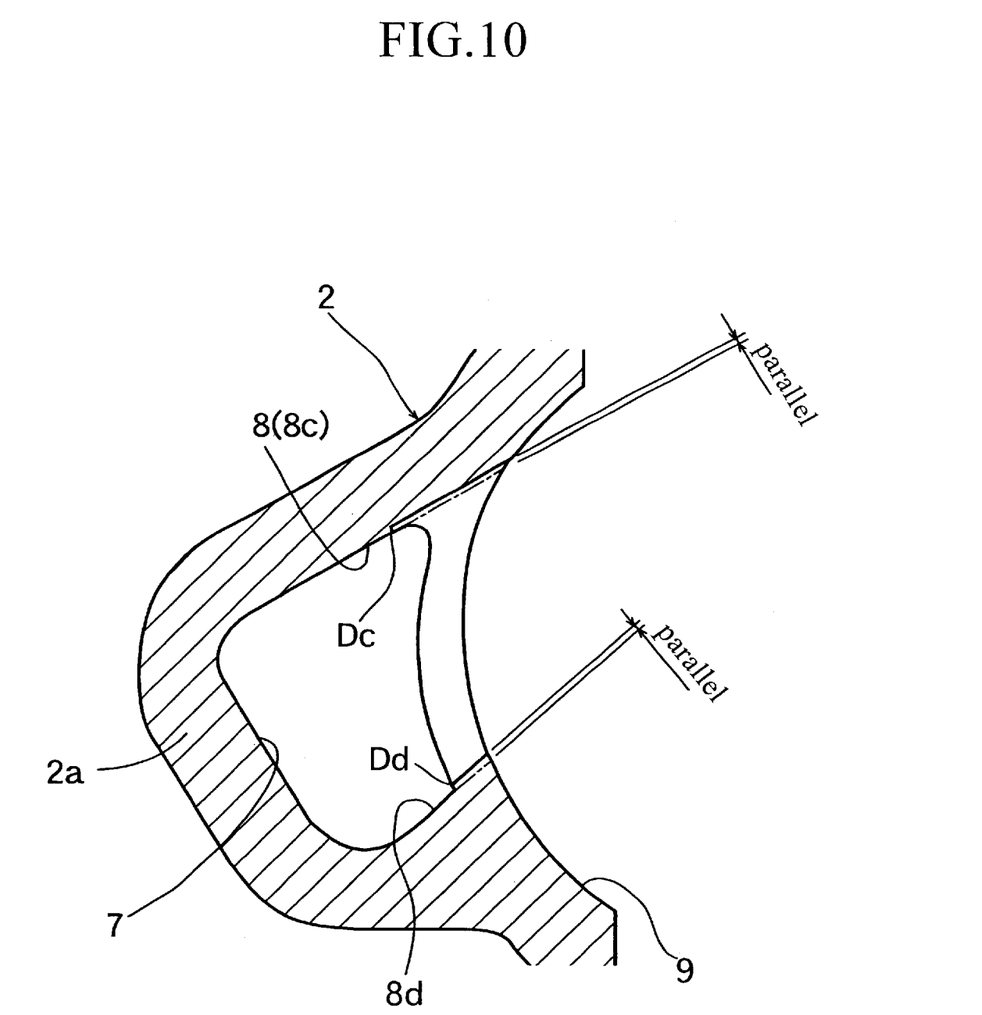
FIG. 10 is an enlarged sectional view for illustrating a peripheral portion of the left scavenging port shown in FIG. 2 for illustrating a conventional manufacturing method.

However, the aforementioned method of cutting out the closed scavenging port portion 12 by mechanical means such as cutting work, electric discharge machining, laser beam machining, etc. for forming the scavenging ports 8 after the casting of the raw cylinder body has the following problems. Namely, as shown in FIGS. 9 and 10, both illustrating enlarged views of the peripheral region of the left side scavenging port 8, when cutting out the closed scavenging port portion 12 by mechanical means such as cutting work, electric discharge machining, laser beam machining, etc. for forming the scavenging ports 8, this cut-out work is required to be performed in such a manner that the inner surface of each of the scavenging ports 8 is made flush with the plane of each of the inner surfaces 8a, 8c and 8d of the hollow scavenging passageways which were previously formed contiguous to each of the closed scavenging port portions 12. Therefore, if there is even a slight deviation in the location of working tools, working direction or the location of the working portion (the location of the scavenging port 8), a step portion Da, Dc or Dd would be generated at the scavenging ports 8. If there is such a step portion Da, Dc or Dd at the scavenging ports 8, it would become a source of scavenging resistance, turbulence of scavenging gas flow, increased mechanical loss, or deterioration in engine performance such as the deterioration in combustibility or in purification of exhaust gas.

It is desirable to prevent the generation of the aforementioned step portions Da, Dc and Dd. It is further desirable to avoid the enhanced precision positioning of the working tools as well as the working location required to a great extent, which results in an increase in manufacturing cost. Indeed, it is impossible to completely obviate the generation of the aforementioned step portion Da, Dc or Dd.

BRIEF SUMMARY OF THE INVENTION

The present invention has been made to overcome the aforementioned problems. Therefore, an object of the present invention is to provide a method for manufacturing a cylinder for an internal combustion engine that avoids the generation of a step portion at the scavenging port without needing to enhance the precision of the positioning of the working tools or the working location in the working process. A raw cylinder body is cast-molded with its scavenging port portion being left closed. Subsequently, this closed scavenging port portion is cut out (or opened) by means of cutting work, electric discharge machining, laser beam machining, etc.

The present invention provides a method of manufacturing a cylinder for an internal combustion engine, wherein the cylinder is provided with an inner wall-attached hollow scavenging passageway having a scavenging port to be opened and closed by the movement of piston. The method essentially comprises two steps. The first step comprises cast-molding a raw cylinder body with its scavenging port portion being left closed. The second step comprises cutting out (or opening) the closed scavenging port portion by means of cutting work, electric discharge machining, laser beam machining, etc. to form the scavenging port.

The step of cutting out the closed scavenging port portion is performed by widening the cylinder bore side of the closed scavenging port portion at a predetermined angle to the plane of the inner wall of the hollow scavenging passageway formed contiguous to the closed scavenging port portion.

According to a preferred embodiment of the method according to the present invention, the predetermined angle is set in such a manner that the opening area of the scavenging port is made increasingly larger as the opening area of the scavenging port is located closer to the cylinder bore.

According to another preferred embodiment of the present invention, the predetermined angle to the plane of the inner wall of the hollow scavenging passageway is not more than 3 degrees.

According to the method of manufacturing a cylinder for an internal combustion engine as proposed by the present invention, because the step of cutting out the closed scavenging port portion is performed by widening the cylinder bore side of the closed scavenging port portion at a predetermined angle to the plane of the inner wall of the hollow scavenging passageway formed contiguous to the closed scavenging port portion, the plane of the cut-out work portion can be intersected with the plane of the inner wall of the hollow scavenging passageway at a shallow angle (not more than 3 degrees). This makes it possible to prevent the generation of the step portion found in cylinders manufactured using the conventional method wherein the cut-out work of the closed scavenging port portion is performed parallel to and coincides with the plane of inner wall of the hollow scavenging passageway.

Therefore, it is possible to provide a cylinder with enhanced engine performance such as with respect to the combustibility or the purification of exhaust gas as compared with the cylinder where the scavenging port is accompanied with a step portion.

Furthermore, because the step of cutting out the closed scavenging port portion is performed by widening the cylinder bore side of the closed scavenging port portion at a predetermined angle to the plane of the inner wall of the hollow scavenging passageway, it is no longer necessary to direct as much attention to enhancing the precision of the positioning of the working tools or the working location, or to make adjustments depending on different kinds of working material (the raw material of the cylinder). As a result, it is now possible, without increasing manufacturing cost, to obtain a cylinder of relatively stable quality.

DETAILED DESCRIPTION OF THE INVENTION

The present invention will be further explained with reference to one embodiment of the method of manufacturing a cylinder 1 for an internal combustion engine according to the present invention.

The cylinder 1 for an internal combustion engine, which can be manufactured by the method according to this embodiment, has the same construction as the cylinder shown in FIGS. 1 and 2. The cylinder includes a pair of hollow scavenging passageways 7 each having an inner wall 10 and a scavenging port 8 to be opened and closed by means of a piston 20. This cylinder can be manufactured by a method essentially comprising two steps. The first step comprises cast-molding a raw cylinder body 1'. In this first step, the portions of the raw cylinder body 1' corresponding to the scavenging ports 8 each constitutes a closed under-cut portion, thus leaving closed scavenging port portions 12 as shown in FIGS. 3 and 4. The second step comprises cutting out (or opening) the closed scavenging port portion 12 by means of cutting work, electric discharge machining, laser beam machining, etc. to form the scavenging port.

Figure 7:
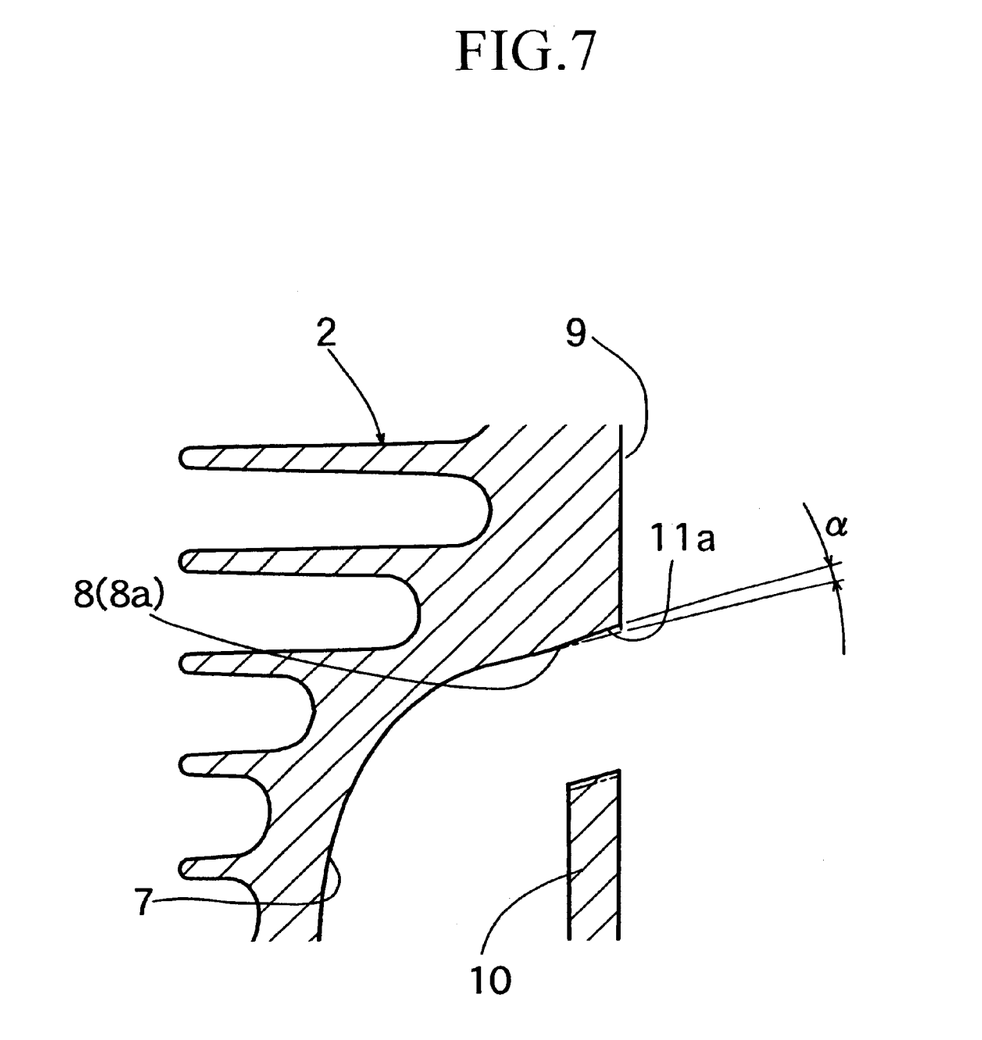
FIG. 7 is an enlarged sectional view for illustrating a peripheral portion of the left scavenging port shown in FIG. 1 for illustrating the method of manufacturing a cylinder for an internal combustion engine.
Figure 8:
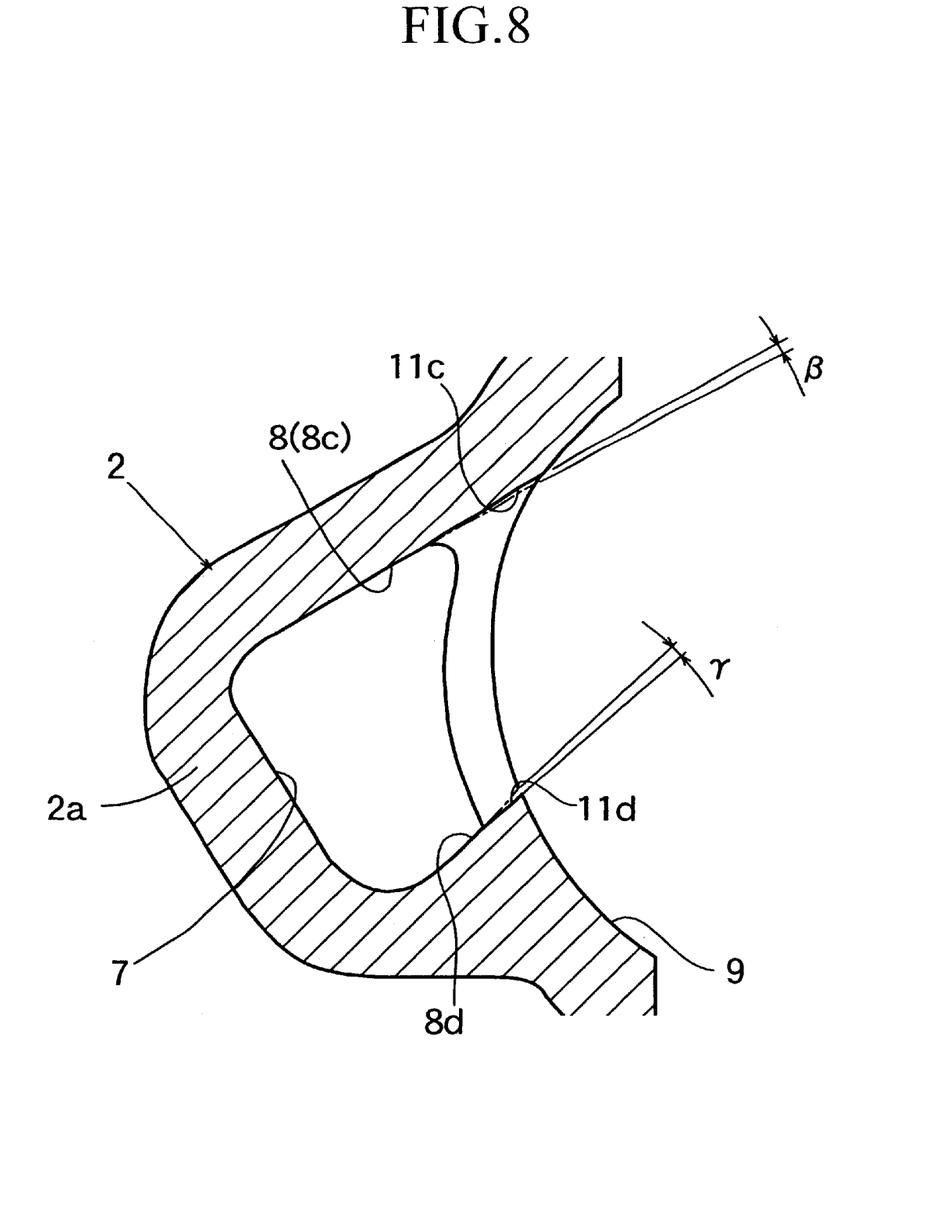
FIG. 8 is an enlarged sectional view for illustrating a peripheral portion of the left scavenging port shown in FIG. 2 for illustrating the method of manufacturing a cylinder for an internal combustion engine.

In this manufacturing method of the cylinder for an internal combustion engine according to this embodiment, as shown in FIGS. 7 and 8 which illustrate an enlarged view of a peripheral portion of the left scavenging port 8, the step of cutting out the closed scavenging port portion 12 is performed by widening the cylinder bore side of the closed scavenging port portion 12 at predetermined angles α, β and γ to the planes 8a, 8c and 8d, respectively, of the inner wall 10 of the hollow scavenging passageway 7 formed contiguous to the closed scavenging port portion 12.

In this embodiment, the angles α, β and γ are set in such a manner that the opening area of the scavenging port 8 is made increasingly larger as the opening area of the scavenging port 8 is located closer to the cylinder bore 9. Specifically, these angles are confined so as not to exceed 3 degrees (1 to 2 degrees in general).

According to the method of manufacturing a cylinder for an internal combustion engine as illustrated by this embodiment, because the step of cutting out the closed scavenging port portion 12 is performed by widening the cylinder bore side of the closed scavenging port portion 12 at predetermined angles α, β and γ to the planes 8a, 8c and 8d, respectively, of the inner wall 10 of the hollow scavenging passageway 7 formed contiguous to the closed scavenging port portion 12, the planes 11a, 11c and 11d of the cut-out work portion 12 can be intersected with the planes 8a, 8c and 8d, respectively, of the inner wall 10 of the hollow scavenging passageway 7 at a shallow angle (not more than 3 degrees), thereby making it possible to prevent the generation of the step portions found in cylinders manufactured using the conventional method.

As a result, it is possible to provide a cylinder 1 with enhanced engine performance characteristics such as with respect to the combustibility or the purification of exhaust gas as compared with the cylinder where the scavenging port 8 is accompanied with a step portion.

Furthermore, because the step of cutting out the closed scavenging port portion is performed by widening the cylinder bore side of the closed scavenging port portion at predetermined angles α, β and γ to the planes 8a, 8c and 8d, respectively, of the inner wall 10 of the hollow scavenging passageway 7, it is no longer necessary to direct as much attention to enhancing the precision of the positioning of the working tools or the working location, or to make adjustments depending on different kinds of working material (the raw material of the cylinder). This method yields a cylinder 1 having excellent and stable quality characteristics, without increasing manufacturing cost.

While in the foregoing one embodiment of the present invention has been explained in detail for the purpose of illustration, it will be understood that the construction of the device can be varied without departing from the spirit and scope of the invention as set forth in the following claims.

What is claimed is:

1. A cylinder for an internal combustion engine comprising:

a bore having an inner wall; and a hollow scavenging passageway separated from the bore by the inner wall, the hollow scavenging passageway having a scavenging port to be opened and closed by the movement of a piston;

wherein the bore side of the scavenging port is widened at predetermined angles to the planes of the inner wall formed contiguous to the scavenging port, wherein the predetermined angles are set in such a manner that the opening area of the scavenging port is increasingly larger as the opening area of the scavenging port is located closer to the bore, wherein the predetermined angles do not exceed 3 degrees.

2. A cylinder for an internal combustion engine comprising:

a bore having an inner wall; and a hollow scavenging passageway separated from the bore by the inner wall, the hollow scavenging passageway having a scavenging port to be opened and closed by the movement of a piston;

wherein the bore side of the scavenging port is widened at predetermined angles to the planes of the inner wall formed contiguous to the scavenging port, wherein the predetermined angles do not exceed 3 degrees.

* * * * *